United States Patent [19]

Yamasaki

[11] Patent Number: 4,707,815
[45] Date of Patent: Nov. 17, 1987

[54] APPARATUS FOR A RECORD PLAYER DISTINGUISHING BETWEEN RECORDED AND UNRECORDED PORTIONS OF A DISC

[75] Inventor: Hiroshi Yamasaki, Yokohamashi, Japan

[73] Assignee: Tokyo Shibaura Denki Kabushiki Kaisha, Kanagawa, Japan

[21] Appl. No.: 180,993

[22] Filed: Aug. 25, 1980

[30] Foreign Application Priority Data

Sep. 29, 1979 [JP] Japan .................................. 54-125476

[51] Int. Cl.⁴ ............................................. G11B 17/00
[52] U.S. Cl. ......................................... 369/33; 369/41
[58] Field of Search ................... 369/33, 41; 307/355, 307/311, 475; 250/211 J, 213 A

[56] References Cited

U.S. PATENT DOCUMENTS

| | | | |
|---|---|---|---|
| 3,465,158 | 9/1969 | Foerster | 307/311 X |
| 3,585,399 | 10/1968 | Andrews | 307/475 X |
| 3,783,277 | 1/1974 | Younkin et al. | 307/311 X |
| 3,959,666 | 5/1976 | Fett et al. | 307/475 |
| 4,109,114 | 8/1978 | Baer et al. | 369/33 |
| 4,237,388 | 12/1980 | Nokubo et al. | 307/475 X |

Primary Examiner—Charles E. Phillips
Attorney, Agent, or Firm—Finnegan, Henderson, Farabow, Garrett & Dunner

[57] ABSTRACT

An unrecorded portion detecting apparatus for a record player. The apparatus has a device such as light-emitting diode for applying light to disc surface and a pair of light-sensitive devices such as phototransistors for sensing light reflected by the disc surface mounted on the tone arm. The pair of light-sensitive devices are separated from each other along a tracing line of the tone arm. The apparatus further has a circuit for producing a detecting signal at the time when the tone arm detects the unrecorded portion, resulting in an output signal from the leading device of the pair of light-sensitive devices. The circuit includes means for uniforming levels of the output signals of the pair of the light-sensitive devices under the same condition, means for differentiating the uniformed signals by a predetermined extent and means for comparing level relationship between the output signals. When the tone arm traces above a boundary when a recorded portion and an unrecorded portion adjoin each other, the level states of the devices as to sensing or not sensing a predetermined level of light are reversed.

3 Claims, 10 Drawing Figures

APPARATUS FOR A RECORD PLAYER DISTINGUISHING BETWEEN RECORDED AND UNRECORDED PORTIONS OF A DISC

FIELD OF THE INVENTION

This invention relates to an apparatus for a record player distinguishing between recorded and unrecorded portions of a disc and, in particular, to such an apparatus utilizing light-reflecting differences on the disc surface.

BACKGROUND OF THE INVENTION

In recent years, automatic record players, which incorporate an apparatus distinguishing between recorded and unrecorded portions of the disc have become well-known. The apparatus is convenient for operating the tone arms automatically and is needed for program-reproducing devices designed to select automatically predetermined recorded blocks to be played from the disc.

Such apparatus for record players must be able to distinguish differences between recorded blocks and unrecorded portions under the condition that the tone arm is above the disc surface. Further, it must reliably perform the detecting function, regardless of incident light.

Conventional apparatus takes advantage of the difference in light-reflecting efficiency between recorded blocks and unrecorded portions. The apparatus of the prior art for detecting between recorded and unrecorded portions of a disc is so constructed as to compare a signal detected from a light-sensitive device with a preset reference value. In such conventional apparatus, the detecting operation is apt to malfunction for any one of several reasons.

For one, the capacity of mass-produced light-emitting diodes and phototransistors to emit light and to detect light, respectively, is not uniform, and the performance of individual components is not consistent. For another, variations in external noise, such as room lighting, or variations of the incidence of the room lighting on the grooves or unrecorded portions, may affect the performance of the detecting apparatus, sometimes giving false signals as to recorded or unrecorded portions.

The lack of uniformity of light-emitting diodes and the phototransistors also adversely affects the production rate of mass-produced tone arms utilizing conventional apparatus for detecting the difference between recorded and unrecorded portions of the disc. The tone arms must be tested and adjusted one by one. In some cases the detection signal entirely fails to match the preset value.

Still further, conventional apparatus has the disadvantage that the apparatus can not clearly detect a boundary section between a recorded block and an unrecorded portion.

SUMMARY OF THE INVENTION

Accordingly, an object of the present invention is to provide an apparatus for a record player for distinguishing between recorded and unrecorded portions of a disc without comparing a detected signal with a reference value.

A further object of the present invention is to provide an apparatus for a record player distinguishing between recorded and unrecorded portions of a disc which is relatively unaffected by external noise influence like room lighting.

A further object of the present invention is to provide an apparatus for a record player distinguishing between recorded and unrecorded portions of a disc which will accurately distinguish the boundary between recorded and unrecorded portions.

A still further object of the present invention is to provide an apparatus for a record player distinguishing between recorded and unrecorded portions of a disc which compensates for variations in efficiency of the components.

In a specific embodiment of the present invention, the apparatus for distinguishing between recorded and unrecorded portions of a disc is provided with:

(a) a tone arm for tracing a disc surface;

(b) a light-emitting diode provided on the tone arm, for applying light to the disc surface;

(c) a pair of phototransistors provided on the tone arm for sensing light reflected by the disc surface, each phototransistor being separated from the other along the tracing line of the tone arm;

(d) means for uniforming signals from the pair of phototransistors, the means including a pair of transistors each having a base connected to the output terminal of the phototransistor, a collector connected to a power source terminal and an emitter resistively connected to a reference source terminal;

(e) means for differentiating the signals from the transistors, the latter means comprising dioderesistor networks; and (f) a comparator connected at its terminals to the pair of transistors through the differentiating means so as to output a signal at the time when its differential input inverses.

Other objects, features and advantages of the present invention will become apparent to persons skilled in the art from a study of the following description taken in conjunction with the accompanying drawings, in which:

BRIEF DESCRIPTION OF THE DRAWINGS

The foregoing FIGS. 3 to 7 and FIG. 8 are presented so as to correspond to each other relative to a groove of the record disc.

DESCRIPTION OF THE PREFERRED EMBODIMENTS

Figure 1:
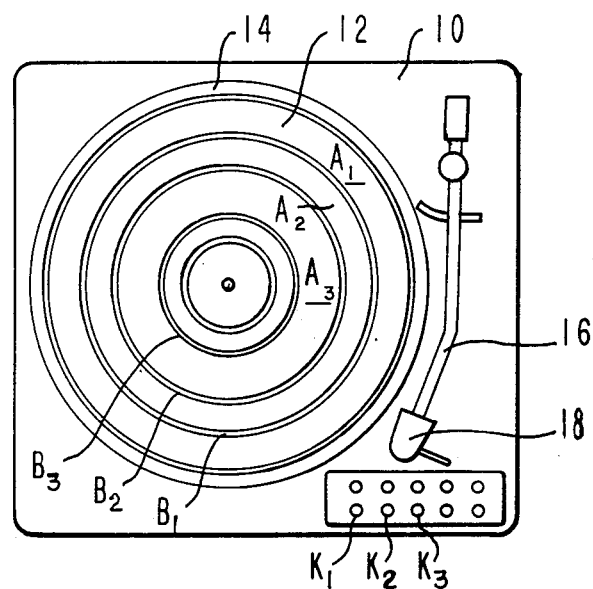
FIG. 1 shows a diagrammatic top view of a record player which loads a record disc on its turntable.

The present invention will be described in detail with reference to the accompanying drawings. Throughout the drawings, like reference numerals will be used to designate like or equivalent portions, for the sake of simplicity of explanation.

Referring now to FIG. 1, there is shown a record player 10 which loads a record disc 12 on a turntable 14.

The record player 10 has a tone arm 16 which may scan at a distance from the record disc 12 along the radius of the turntable 14 and trace a groove cut on the record disc 12, by means of a reproducing head 18. The reproducing head 18 has a stylus 20 for picking up a recorded signal on the record disc 12, a light-emitting diode 22 and a pair of phototransistors 24 and 26 on the side facing the disc, as shown in FIG. 3 to FIG. 7. The tone arm 16 is automatically swung so as to bring the reproducing head 18 to a proper recorded block among several recorded blocks $A_1$, $A_2$, $A_3$... each spaced from the next inward block by unrecorded portions $B_1$, $B_2$, $B_3$..., respectively, in automatic recorded block search operation.

Now the circuit for distinguishing the unrecorded portion or recorded block on the disc surface by using the pair of phototransistors 24 and 26 will be explained according to FIG. 2. The circuit includes a light-sensing-signal producing circuit C, a coupling circuit D and a signal comparing circuit E. The light-sensing-signal producing circuit C includes the pair of phototransistors 24 and 26. The pair of phototransistors 24 and 26 each has a collector, an emitter and a light-sensing base. Each emitter of the phototransistors 24 and 26 is coupled to a reference source terminal 28. Each collector is coupled to a power source terminal 30 through respective collector load resistors 32, 34 and a common collector load resistor 36 like a potentiometer, and further coupled to bases of a pair of transistors 38 and 40, respectively, in the coupling circuit D. The coupling circuit D is further divided into two parts, one being a signal uniforming circuit $D_1$ and the other being a potential difference established circuit $D_2$. The signal uniforming circuit $D_1$ has the pair of transistors 38 and 40. The pair of transistors 38 and 40 each has a collector, an emitter and the base, each collector being coupled to the power source terminal 30 and each emitter being coupled to the reference source terminal 28 through, respectively, emitter follower resistors 42 and 44. Both resistors 42 and 44 have the same resistance so that both emitter potentials are at the same level if the transistors are in the same condition. As stated previously, two supposedly like mass-produced phototransistors may give uneven signals although exposed to the same light. The signal-uniforming circuit $D_1$, produces signals of like value, for application to the potential differentiating circuit $D_2$, as long as the signals produced by the phototransistors and applied to the bases of the transistors 38, 40 are sufficient to switch the transistors to the ON state. In the ON state of transistors 38, 40, the same currents flow from the power source terminal 30 through the transistors and resistors 42, 44 to the reference source terminal 28. As a result, the circuit $D_1$ uniforms the strength of the signals produced by the phototransistors 24, 26 and compensates for any difference therebetween.

The emitters of the transistors 38 and 40 are coupled respectively, to a pair of input terminals P and Q of an operational amplifier 46 constructing the signal comparing circuit E through the potential difference establishing circuit $D_2$. The potential differentiating circuit $D_2$ includes a direct coupling line 50 between the emitter of the transistor 38 and the inversed input terminal Q, a first resistor 52 coupled between the emitter of the transistor 40 and the non-inversed input terminal P, a second resistor 54 coupled at its one end to the non-inversed input terminal P, a third resistor 56 coupled between the second resistor 54 and the reference source terminal 28, and a diode 58 parallelly coupled across the first and second resistors 52 and 54 under the forward bias condition.

The potential of the terminal Q is always the same as the emitter potential of the transistor 38. The potential of the terminal P is, however, always less than the emitter potential of the transistor 40 by value which is shown by the following equation:

$$V_P = V_1 - V_{BE} \times \frac{R_1}{R_1 + R_2} = V_1 - 0.6 \times \frac{R_1}{R_1 + R_2} = V_1 - V_C$$

where $V_P$ is the potential of the terminal P, $V_1$ is the emitter potential of the transistor 40, $V_{BE}$ is the forward voltage of the diode 58, $R_1$ is the resistance of the resistor 52 and $R_2$ is the resistance of the resistor 54.

Furthermore, the output level $V_S$ of the output terminal OUT of the operational amplifier 46 is in condition of the low level $V_{SL}$ when the level of the terminal P is lower than the level of the terminal Q and the output level $V_S$ is in condition of the high level $V_{SH}$ when the potential level of the terminal P is higher than the level of the terminal Q.

On the other hand, the light-emitting diode 22 is coupled between the power source terminal 30 and the reference source terminal 28 through a resistor 60 in condition of the forward bias.

Description will now be made of the operation of the circuit shown in FIG. 2 in referring to FIGS. 3 through 8. The record player 10 having this type of apparatus has a plurality of operation-commanding keys $K_1$, $K_2$, $K_3$... as shown in FIG. 1, for example, a normal reproducing starting key for automatically setting the tone arm 16 on an outer unrecorded portion, some desired recorded block selecting keys for setting the tone arm on one of unrecorded portions $B_1$, $B_2$ and $B_3$... each placed between two adjoining recorded blocks, or a program reproducing key for automatically setting the tone arm from one to the other of the unrecorded portions successively, according to a set program. When one of the program-reproducing keys is operated in a program that a reproduction of the record disc is started from any desired recorded block, for example, the block $A_2$, the tone arm 16 is automatically moved above the disc surface for the desired recorded block $A_2$. The distinguishing process for the desired recorded block is explained by using FIGS. 3 to 7.

Figure 3:
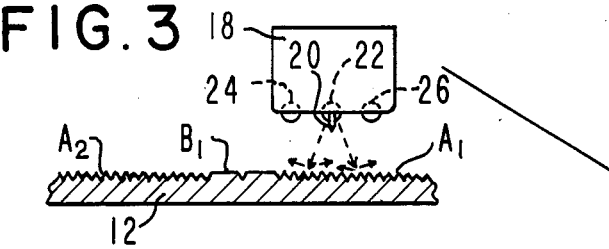
FIGS. 3 to 7 are diagrams of assistance in explaining the operation of the present invention.
Figure 8:
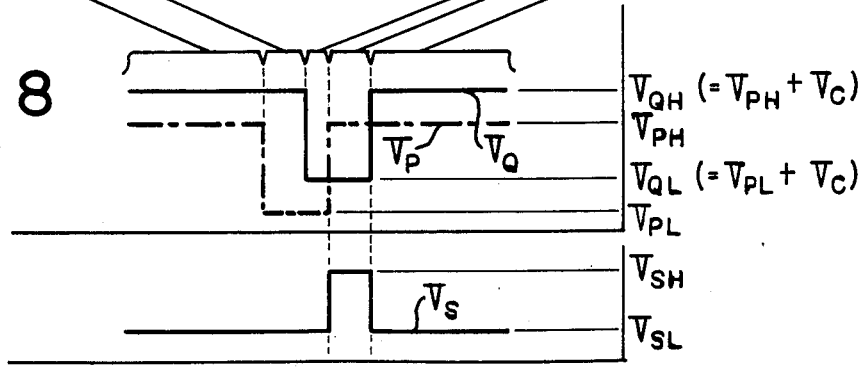
FIG. 8 is a group of characteristic waveform diagrams illustrating the distinguishing process in accordance with the present invention.

First, when the reproducing head 18 is moving above any recorded portion, for example, $A_1$, toward the desired recorded block $A_2$, as shown in FIG. 3, the light emitted from the light emitting diode 22 is diffused at the surface of the recorded block $A_1$, because the surface is divided by the grooves cut close to each other. Therefore, neither of the pair of the phototransistors 24 and 26 receives sufficient reflected light to activate the phototransistors. At this time, the phototransistors 24 and 26 are both in OFF states or high-resistance states. Accordingly, each collector of the phototransistor 24 or 26 has a high potential, close to the power source potential $V_{DD}$, and the respective transistors 38 and 40 are kept in ON states or low-resistance states. Thus, both emitters of the transistors 38 and 40 are kept in high potential states. The potentials of the input terminals P and Q of the operational amplifier are kept in the potential $V_{PH}$ and $V_{QH}$, respectively, as shown in FIG. 8, wherein the potential $V_{QH}$ is higher than the potential $V_{PH}$ by the voltage $V_C$. In this state, the output level $V_S$ is kept in the low level $V_{SL}$ because the level of the terminal P is lower than the level of the terminal Q. As a result, the operational amplifier 46 does not operate the circuitry (not shown) for stopping the tone arm 16 and the tone arm 16 is further moved forward.

Figure 4:
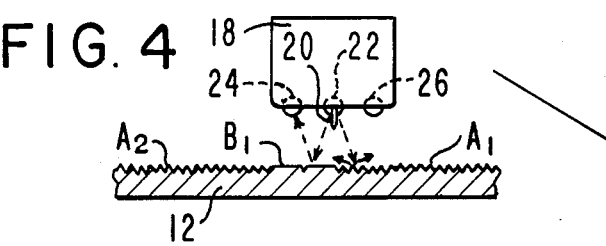

Secondly, when the reproducing head 18 has been moved over the boundary where the recorded block $A_1$ and the unrecorded portion $B_1$ adjoin each other, as shown in FIG. 4, the light-emitting diode 22 throws light across the boundary. Then the unrecorded portion $B_1$ reflects the light well because the groove on the surface of the unrecorded portion $B_1$ are separated much farther from each other. Accordingly, the phototransistor 24 which approaches the unrecorded portion $B_1$ first, receives the reflected light sufficiently to be activated or at least a predetermined level of reflected light. However, the phototransistor 26 which is farther from the unrecorded portion $B_1$ still fails to receive its reflected light.

At this time, the phototransistor 24 turns to the ON state, but the phototransistor 26 stays in the OFF state. Therefore, only the potential of the terminal Q falls to a low level $V_{QL}$ lower than the potential $V_{PH}$ of the terminal P so that the output level of the operational amplifier 46 turns to high level $V_{SH}$. The output signal in the high level $V_{SH}$ is sent to a control circuit (not shown) and counted. If the result of the counting agrees with the programmed condition, the tone arm 16 is controlled to land on the unrecorded portion $B_1$.

Figure 5:
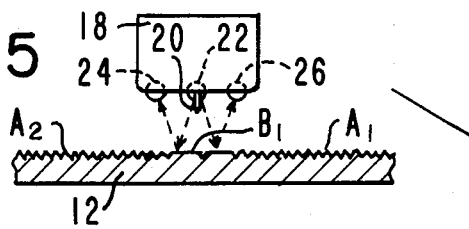

Otherwise, the tone arm 16 is farther moved ahead. Accordingly, the reproducing head 18 progresses over the unrecorded portion B as shown in FIG. 5. At this time, the phototransistors 24 and 26 both receive the reflected light sufficiently and become in the ON state. Therefore, the potentials of the terminals P and Q become respective low levels $V_{PL}$ and $V_{QL}$. The level of the terminal P, $V_{PL}$, is also lower than the level $V_{QL}$ of the terminal Q by the voltage $V_C$ so that the output state of the operational amplifier 46 returns to low level $V_{SL}$.

Figure 6:
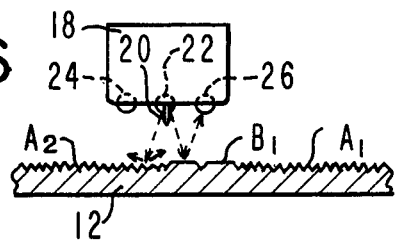

Further, when the reproducing head 18 has been brought over the next boundary where the unrecorded portion $B_1$ and the next recorded block $A_2$ adjoin each other, as shown in FIG. 6, only the phototransistor 24 fails to receive the reflected light and turns to OFF state. Therefore, only the potential of the terminal Q goes into higher level $V_{QH}$ so that the output of the operational amplifier 46 stays in low level $V_{SL}$.

Figure 7:
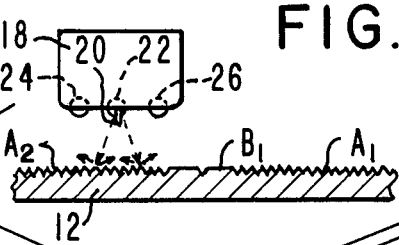

Also, when the reproducing head 18 farther goes ahead over the next recorded block as is shown in FIG. 7, the output of the operational amplifier 46 stays in low level.

In such a manner, only when the reproducing head 18 has been brought over an unrecorded portion is the distinguishing signal, as the high level output of the operational amplifier 46, reduced.

Figure 9:
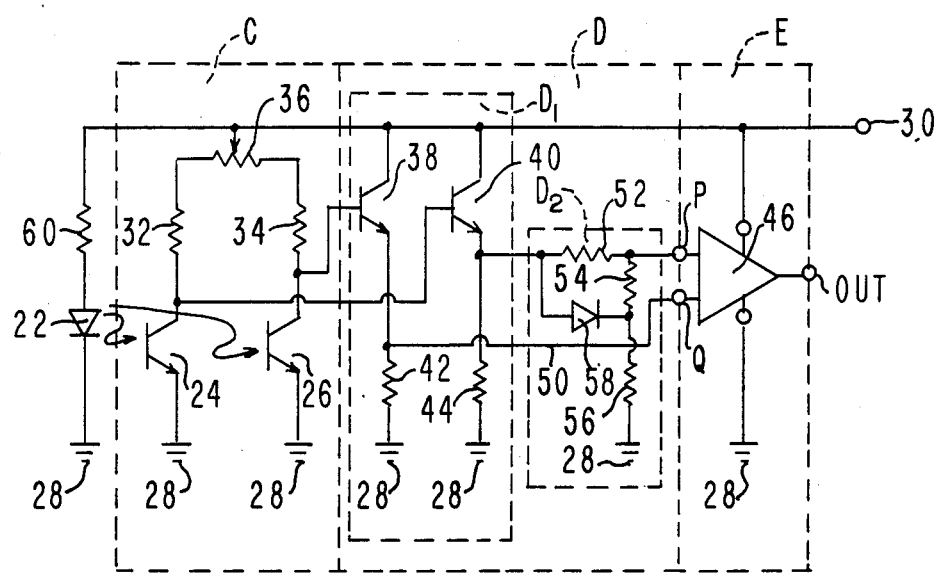
FIG. 9 shows a modified circuit diagram from FIG. 2.

The present invention may be modified as following description, referring to FIG. 9. The modification of FIG. 9 is different from FIG. 2 in that the connection relationship between the phototransistors 24 and 26 and the two inputs P and Q of the operational amplifier 46 are reversed. That is, the leading phototransistor 24 is associated with the non-inversed input P of the operational amplifier 46, and the trailing phototransistor 26 is associated with the inversed input Q. As a result, the output level $V_S$ of the output OUT of the operational amplifier 46 becomes the high level $V_{SH}$, when the reproducing head 18 comes to the position over the boundary where the unrecorded portion, for example, $B_1$ and the next recorded portion $A_2$ adjoin each other, as shown in FIG. 10.

Figure 2:
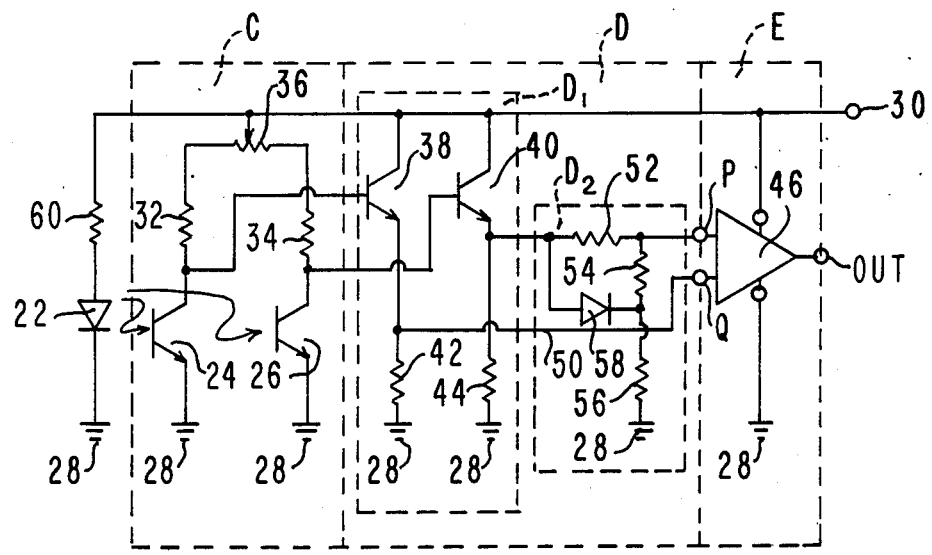
FIG. 2 shows a circuit diagram of an apparatus embodying the present invention.
Figure 10:
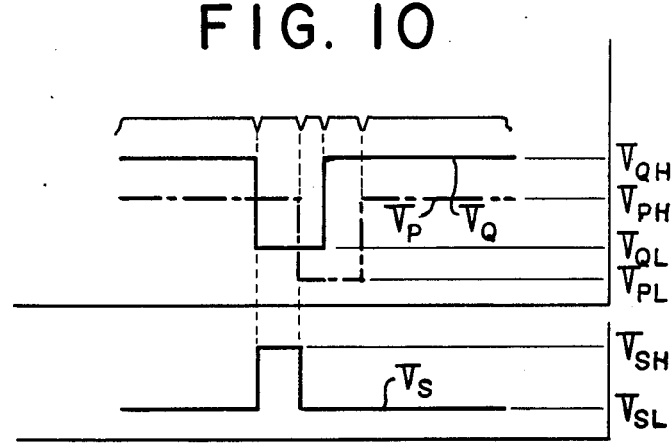
FIG. 10 is another group of characteristic waveform diagrams of FIG. 9.

Accordingly, one embodiment referring to FIGS. 2 and 8 can detect the head portion of the unrecorded block and other embodiment referring to FIGS. 9 and 10 can detect the end portion of the unrecorded block.

As disclosed herein, it is preferred that a light source such as a light-emitting diode, be used on the tone arm to supply a uniform source of light. It is apparent, however, that good room lighting conditions can also be used as the light source, if desired.

What is claimed is:

1. Apparatus, including a tone arm, for use with equipment for playing a disc, said apparatus distinguishing between recorded and unrecorded portions of the disc, comprising:

a pair of light-sensitive devices mounted on the tone arm for facing the disc, the devices being spaced across the width of the tone arm in leading the trailing positions for sensing light reflected from separate but adjacent portions of the disc, said devices individually producing an electrical signal when at least a predetermined level of reflected light is sensed;

a circuit for uniforming the potential strength of said electrical signals produced by said light-sensitive devices including a pair of transistors each having a base, a collector and an emitter, each base being connected respectively to the output terminal of the light-sensitive devices, each collector being connected to a terminal of a like power source, and each emitter being resistively connected to a like reference source terminal; and means coupled to said light-sensitive devices through said uniforming circuit for determining the relative states of the devices as being reversed or not reversed from a predetermined relationship between the devices as to sensing or not sensing said predetermined level of light, said means comprising:

a circuit for establishing a difference between the potentials of the signals emitted by said devices through said uniforming circuit when said predetermined light level is sensed for establishing said predetermined relationship, and a comparator, said comparator having a pair of input terminals each connected to an individual one of said light-sensitive devices through said potential difference establishing circuit and said uniforming circuit, said potential difference establishing circuit including a first resistor connected between one of the transistors and one of the input terminals of said comparator, a second resistor connected at one end to said one comparator input terminal, a third resistor connected between said second resistor and the reference source terminal, a forward diode parallelly connected to both of said first and second resistors, and a direct connection between the other transistor and the other input terminal of said comparator.

2. The apparatus according to claim 1 wherein the leading light-sensitive device is connected to a non-inverted input terminal of said comparator while the trailing light-sensitive device is connected to an inverted input terminal of said comparator.

3. The apparatus according to claim 1 wherein the leading light-sensitive device is connected to an inverted input terminal of said comparator while the trailing light-sensitive device is connected to a non-inverted input terminal of said comparator.

* * * * *